United States Patent [19]
Holcomb et al.

[11] Patent Number: 6,027,699
[45] Date of Patent: Feb. 22, 2000

[54] MATERIAL FORMING APPARATUS USING A DIRECTED DROPLET STREAM

[75] Inventors: David E. Holcomb, Oak Ridge; Srinath Viswanathan; Craig A. Blue, both of Knoxville; John B. Wilgen, Oak Ridge, all of Tenn.

[73] Assignee: Lockheed Martin Energy Research Corp., Oak Ridge, Tenn.

[21] Appl. No.: 08/901,711

[22] Filed: Jul. 28, 1997

[51] Int. Cl.[7] .............................. B01J 19/08; B01J 19/12
[52] U.S. Cl. ................. 422/186.04; 118/627; 239/690; 239/697
[58] Field of Search ................. 204/164; 422/186.04; 427/475; 222/590; 118/620, 623, 627; 239/690, 696, 697, 698, 708

[56] References Cited

U.S. PATENT DOCUMENTS

| | | | |
|---|---|---|---|
| 4,264,641 | 4/1981 | Mahoney et al. | 427/30 |
| 5,062,936 | 11/1991 | Beaty et al. | 204/164 |
| 5,266,098 | 11/1993 | Chune et al. | 75/335 |
| 5,407,136 | 4/1995 | West et al. | 239/589 |
| 5,431,315 | 7/1995 | Chun et al. | 222/590 |
| 5,643,796 | 7/1997 | Van Den Engh et al. | 436/50 |
| 5,807,437 | 9/1998 | Sachs et al. | 118/688 |
| 5,810,988 | 9/1998 | Smith, Jr. et al. | 204/666 |

OTHER PUBLICATIONS

Warnica et al., "Charge synchronization for a piezoelectric droplet generator," Rev. Sci. Instrum. 64 (8), Aug. 1993, pp. 2334–2339.

*Primary Examiner*—Kathryn Gorgos
*Assistant Examiner*—Wesley A. Nicolas
*Attorney, Agent, or Firm*—Wilson, Sonsini, Goodrich & Rosati

[57] ABSTRACT

Systems and methods are described for rapidly forming precision metallic and intermetallic alloy net shape parts directly from liquid metal droplets. A directed droplet deposition apparatus includes a crucible with an orifice for producing a jet of material, a jet destabilizer, a charging structure, a deflector system, and an impact zone. The systems and methods provide advantages in that fully dense, microstructurally controlled parts can be fabricated at moderate cost.

13 Claims, 7 Drawing Sheets

MATERIAL FORMING APPARATUS USING A DIRECTED DROPLET STREAM

STATEMENT AS TO RIGHTS TO INVENTIONS MADE UNDER FEDERALLY-SPONSORED RESEARCH AND DEVELOPMENT

This invention was made with United States government support awarded by the United States Department of Energy under contract to Lockheed Martin Energy Research Corporation. The United States has certain rights in this invention.

BACKGROUND OF THE INVENTION

1. Field of the Invention

The present invention relates generally to the field of solid part fabrication. More particularly, the present invention relates to the fabrication of parts by directed droplet deposition ($D^3$). Specifically, a preferred implementation of the present invention relates to deposition of fully dense, close tolerance parts with a deflected droplet stream that is steered. The present invention thus relates to a fabrication technique of the type that can be termed directed droplet deposition ($D^3$).

2. Discussion of the Related Art

Forming precisely shaped, high strength parts is a major part of the world economy. Fields as diverse as automobiles, medicine, electronics, and national defense are critically dependent on precisely shaped parts. What is urgently needed is a manufacturing technique that can reduce the number of steps involved in going from engineering drawing to the final part.

As is known to those of skill in the art, a previously recognized impediment to rapid manufacturing is the fabrication of hard tooling for component manufacture. Presently, the majority of tooling used for metal forming, plastic injection, die casting, and investment casting is machined from large blocks of metal.[1] This traditional manufacturing approach involves high costs and long lead times. In addition, the associated traditional manufacturing techniques also pose environmental risks through the generation of significant waste metal and machining fluid.

Another previously recognized impediment to rapid manufacturing is the production of prototypes for verification of design. Presently, prototypes are manufactured in the same way that the tooling produced or by alternate techniques involving less robust or costly tooling. In most cases, the prototypes manufactured in this manner have properties and performance characteristics that are inferior to the desired part. Again, this traditional approach is costly, requires long lead time and poses environmental risks.

Therefore, what is needed is a new approach that can be used to produce tooling and/or prototypes quickly and with less environmental risk. Heretofore, these requirements have not been fully met.

One unsatisfactory previously recognized approach, in an attempt to solve the problems referred to above, involves the use of computer-aided-design (CAD) and numerical control (NC) machining. This involves the use of software to generate instructions for computer controlled machines directly from CAD or electronic representations of parts. The instructions, called NC tool paths, are used to drive NC machine tools to automatically machine parts from blocks of metal. However, the generation of NC tool paths can be complicated, time-consuming, and involve excessive trial and error, especially for parts of complex shape. Also, the process still generates a significant amount of waste metal and machining fluid.

Another more recent, but still somewhat unsatisfactory approach for the production of parts and prototypes is the use of rapid prototyping (RP) technologies. Starting from CAD descriptions of solid or surface models of a part, RP technologies allow the production of three-dimensional (3D) physical models by the assembly of sequential layers of material corresponding to successive cross-sections of the part. These sequential cross-sections collectively define the shape of the object. Initially, RP technologies such as stereolithography (SLA), selective laser sintering (SLS), and laminated object manufacturing (LOM) produced resin, polymer, or laminated paper parts. More recently, they have evolved to the use of polymer coated metal powders and the use of lasers to fuse successive cross-sections of metal powders for the production of metal parts or prototypes (SLS, Three-Dimensional Printing, Laser Engineered Net Shaping process, Directed Light Deposition, Shape Deposition Manufacturing, etc.). However, all these processes use precision powder feedstock and have low deposition rates, making them expensive and slow, and typically produce porous parts that must be subsequently densified or infiltrated by a secondary metal to close porosity, making them unsuitable as the final part.

Meanwhile, in other fields of endeavor, those of skill in the art have been forming charged droplets and directing these charged droplets with electrostatic fields.[2-3] The below-referenced U.S. Patents disclose methods of forming charged small droplets that were satisfactory for the purposes for which they were intended. The entire contents of U.S. Pat. Nos. 5,431,315; 5,407,136; 5,266,098; 5,062,936; and 4,264,641 are hereby expressly incorporated by reference into the present application.

Within this application several publications are referenced by superscripts composed of Arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and. illustrating the state of the art.

SUMMARY OF THE INVENTION

Therefore, there is a particular need for a directed droplet deposition system that directs charged droplets into an impact zone so as to form structures. The invention is applicable to any material that has a low viscosity liquid phase. Thus, it is rendered possible to simultaneously satisfy the above-discussed requirements of short lead times, lower environmental risks, and low cost, which, in the case of the prior art, are mutually contradicting and cannot be simultaneously satisfied.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the components and operation of model systems provided with the present invention, will become more readily apparent by referring to the exemplary, and therefore nonlimiting, embodiments illustrated in the drawings accompanying and forming a part of this specification, wherein like reference numerals designate the same elements in the several views. It should be noted that the features illustrated in the drawings are not necessarily drawn to scale.

DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

Figure 1:
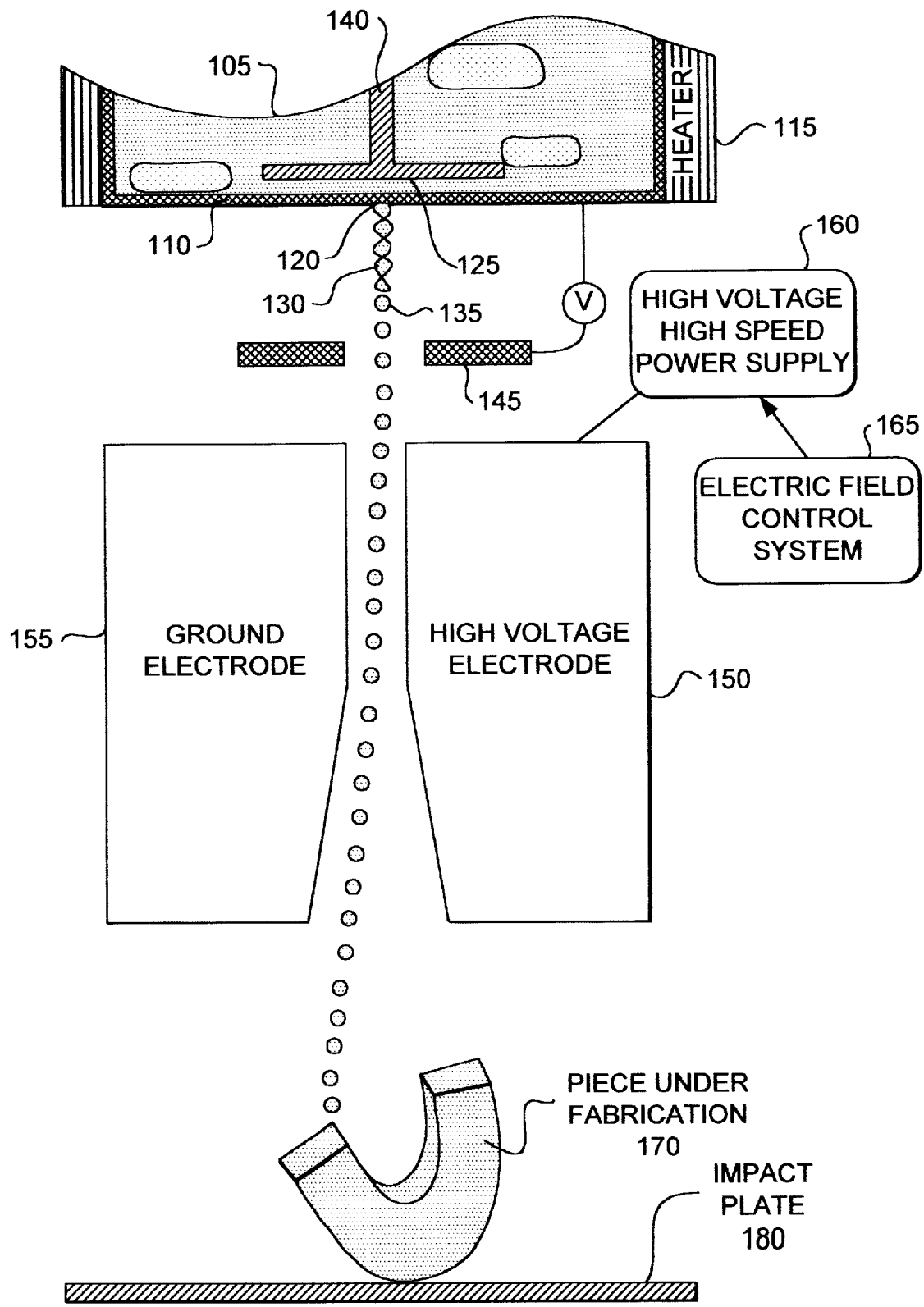
FIG. 1 illustrates a block level schematic elevational view of a first single jet droplet material forming process for droplet deflection, representing an embodiment of the present invention.

Referring to FIG. 1, a material 105 is melted in a crucible 110 by a heater 115. The crucible 110 includes at least one hole 120. If the hole 120 is shaped, it can be referred to as an orifice. The hole 120 is located in an orifice plate 125 that is located at the bottom of the crucible 110. Generically, the crucible 110 can be termed a melting vessel. The genus of melting vessels includes crucibles, skull melting apparatus (e.g. for titanium), and even ultrasonic melting apparatus.

Figure 12:
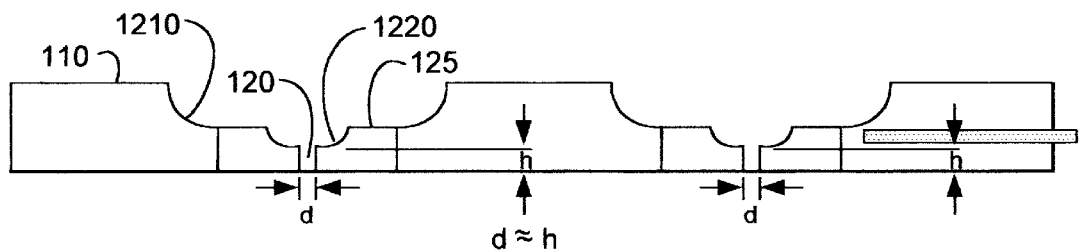
FIG. 12 illustrates a side view of an orifice plate located in the bottom of a melting vessel, representing an embodiment of the present invention.

Referring now to FIG. 12, a larger scale side view of the orifice plate 125 is shown. The plate 125 is located in the bottom of the crucible 110. The inside surface of the bottom of the crucible 110 includes a cup-shaped recess 1210. Similarly, the inside surface of the orifice plate 125 includes a cup-shaped recess 1220. The diameter of the hole 120 ($d$) is approximately equal to the nonrecessed thickness of the plate 125 ($h$). These feature coact to provide a jet (not shown) having a high degree of laminar flow.

It should be noted that there could be more than one hole in the bottom of the crucible. A second hole is shown in FIG. 12. Also, more than one crucible is possible, and may be necessary in the case where the apparatus operates with different alloys such as, for example, tin and steel. In the case of plural holes, each can be a different diameter. Further, it is advantageous for each of the holes to have the capability of being individually opened and closed.

Referring again to FIG. 1, a pressure head causes molten material 105 to flow through the hole 120 and form a laminar jet 130. The laminar jet 130 is periodically destabilized using a mechanical jet destabilizer (Raleigh destabilization). In the depicted embodiment, the mechanical jet destabilizer can be a piezoelectrically driven plunger 140 placed in the molten material 105. The action of the plunger 140 breaks the jet 130 into a series (stream) of individual droplets 135.

In more detail, the plunger 140 generates a time varying pressure wave in the jet 130. The jet 130 is destabilized by the pressure wave. The frequency of the pressure wave is advantageously set to a natural harmonic of the laminar jet 130 resulting in a controlled, systematic breakup of the jet into a stream composed of a plurality of uniformly sized droplets 135.

In this way, the mechanical jet destabilizer augments the pressure head. In the case of plural holes, each hole and its associated orifice plate can be provided with a separate mechanical jet destabilizer.

As molten material flows away from the hole 120, it approaches a charging structure. In the depicted embodiment, the charging structure is a disc shaped charging plate 145. However, plate 145 can take any form, such as, for example, a torus. The plate 145 can be maintained at an electric potential, relative to the crucible 110, so as to assist in breaking the jet 130 into the series of droplets 135.

As the jet 130 approaches the plate 145 an electronic charge accumulates (is induced) at the tip of the jet 130. The charge accumulation on the tip results in self-repulsion within the droplet stream. The charge is retained upon each drop in said first stream of droplets. Therefore, the charge also assists in preventing recombination of droplets 135. Thus, the combined effects of the vibration and charge accumulation results in a series of charged droplets.

The amount of excess charge that can be induced on any droplet is a function of the strength of the electric field, the properties of the jet material (surface tension, viscosity, etc.), and the droplet surface area. The charge is retained on the droplets as they break off. Since the uniformly sized droplets break off from the jet at a consistent spot in the electric field gradient, they have a uniform charge-to-mass ratio. Therefore, the droplets can be precisely electrostatically directed via a steering procedure.

Still referring to FIG. 1, the charged droplets are electrostatically steered through the use of an electrode array that includes a high voltage electrode 150 and a ground electrode 155. The high voltage electrode 150 is driven by a high voltage high speed power supply 160. The supply 160 is controlled by an electric field control system 165. The jet destabilizer 140 and the charging structure 145 cooperate to locate a first break-up point where a first stream of droplets is formed from said the jet 130 of material. The jet destabilizer 140 and the charging structure 145 also cooperate to determine a charge to mass ratio that is substantially equal for each drop in said first stream of droplets.

The droplets 135 impact a surface of a piece under fabrication 170 at prescribed locations. The piece under fabrication 170 is held adjacent to an impact surface 180. A cooled, metal plate would be a suitable impact surface. However, the impact structure need not be a plate.

Lateral translation of the impact plate permits deposition of larger parts. The part itself can be charged to redirect the droplet impact, thereby assisting with the formation of complex structure. A tilting and rotating platform mounting for the surface 180 is useful for the fabrication of sharp overhanging structures, such as, for example, T-shaped features.

Figure 2:
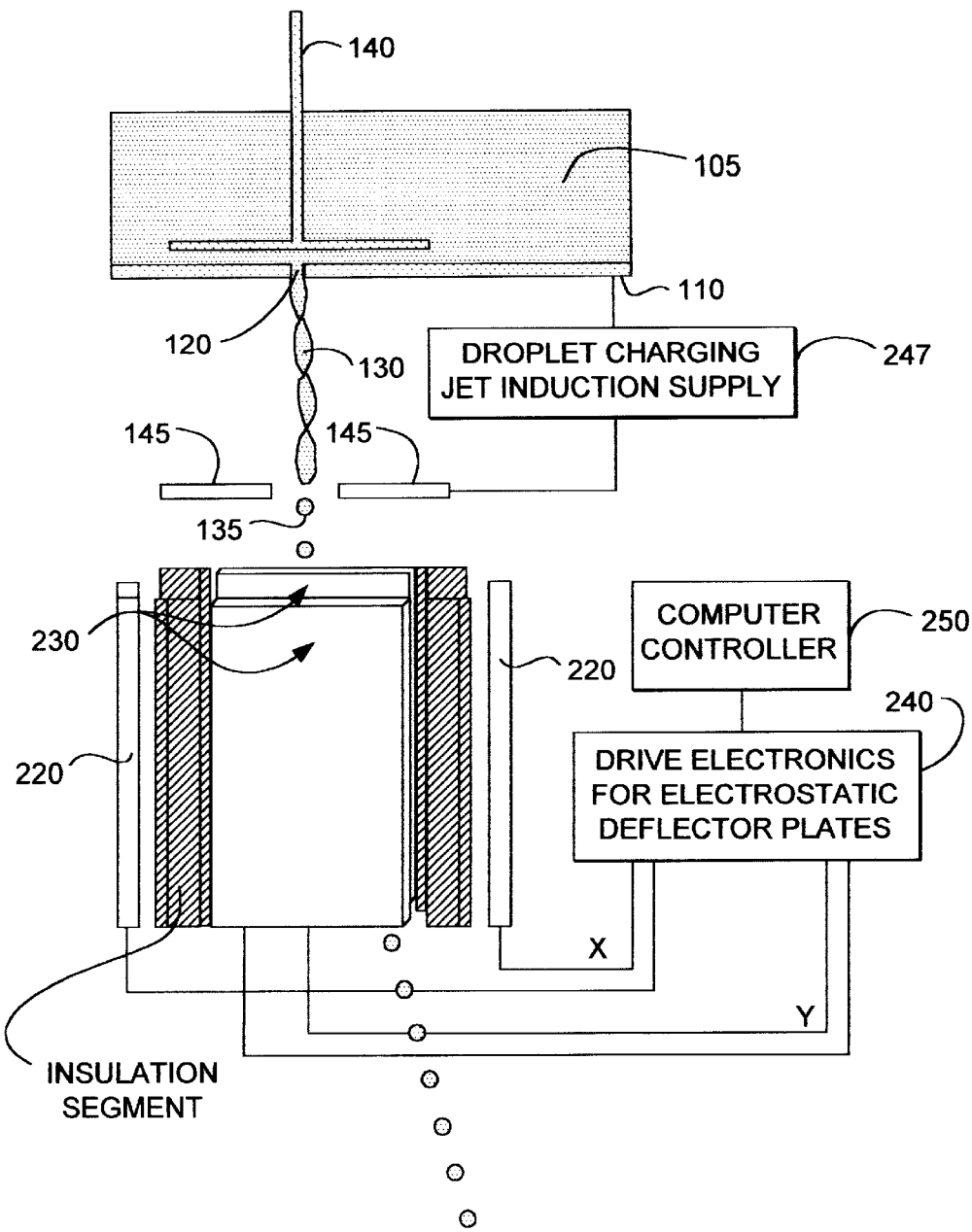
FIG. 2 illustrates a block level schematic view of a second single jet droplet material forming process for deflection in two directions, representing an embodiment of the present invention.

Referring now to FIG. 2, another embodiment of the invention is shown. Here, elements that are the same as the elements of the embodiment depicted in FIG. 1 are assigned. the same detail numerals. The charging structure is connected to crucible 110 with a droplet charging jet induction supply 247.

In the embodiment shown in FIG. 2, the important function of steering is accomplished by using an electrostatic structure giving both x and y directional control to each droplet. The structure includes a pair of X deflector electrodes 220 and a pair of Y deflector electrodes 230. The electrodes 220 and 230 can be grids or plates or any other field establishing structure. The electrodes 220 and 230 are driven by a set of drive electronics for electrostatic deflector electrodes 240. The drive electronics 240 are controlled by a computer controller 250.

Figure 8:
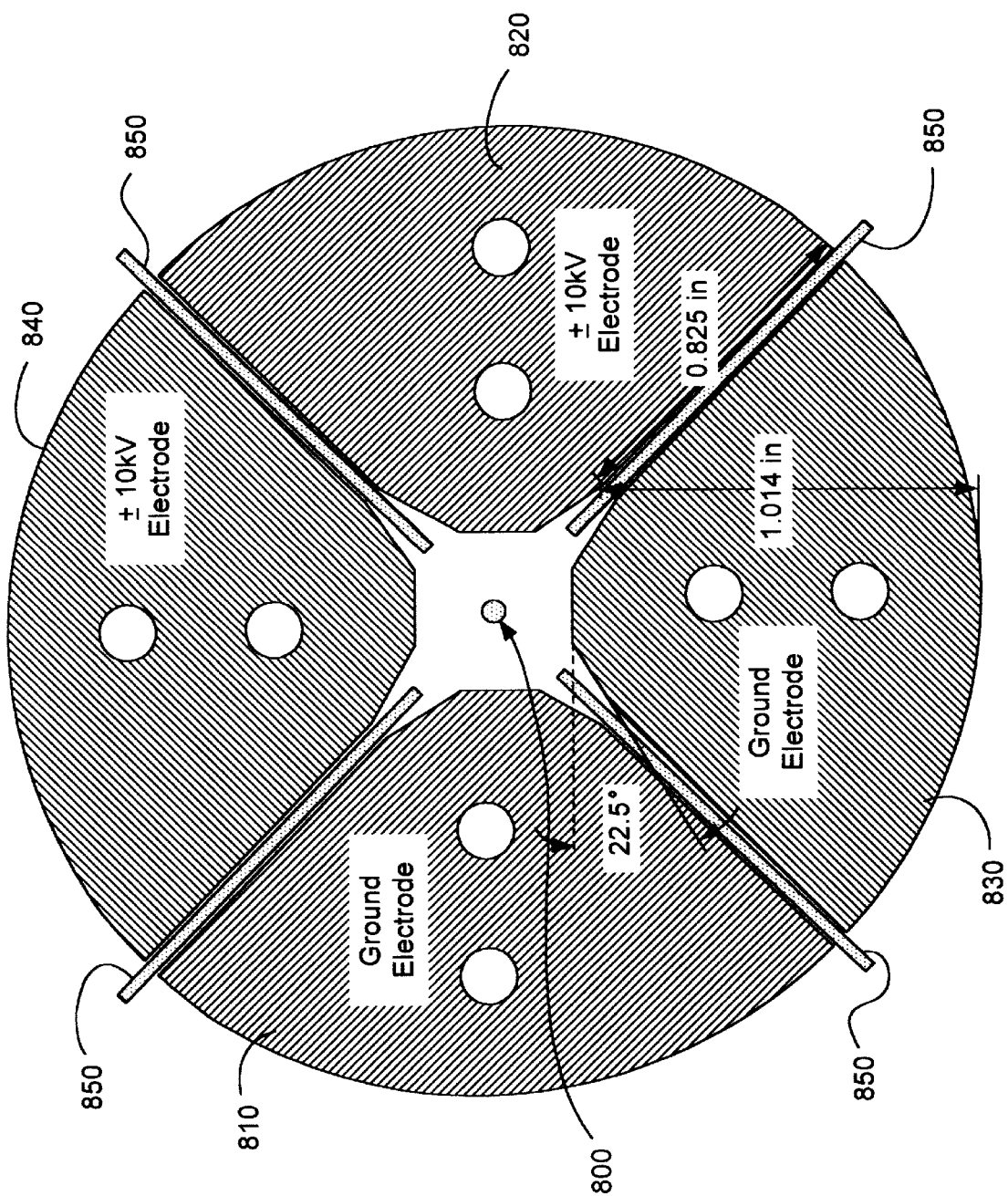
FIG. 8 illustrates a top plan view of a set of electrodes, representing an embodiment of the present invention.

Referring now to FIG. 8, a specific set of electrodes for steering the drops that compose a droplet stream 800 includes a first ground electrode 810, a first ±10 kV electrode 820, a second ground electrode 830, and a second ±10 kV electrode 840. Each of the electrodes 810, 820, 830 and 840 can include two screw holes 860. The electrodes 810, 820, 830 and 840 can be made of an aluminum alloy. Each of the electrodes 810, 820, 830 and 840 is separated from the other electrodes by insulators 850 to prevent arcing. The insulators 850 can be made of TEFLON.

Figure 9:
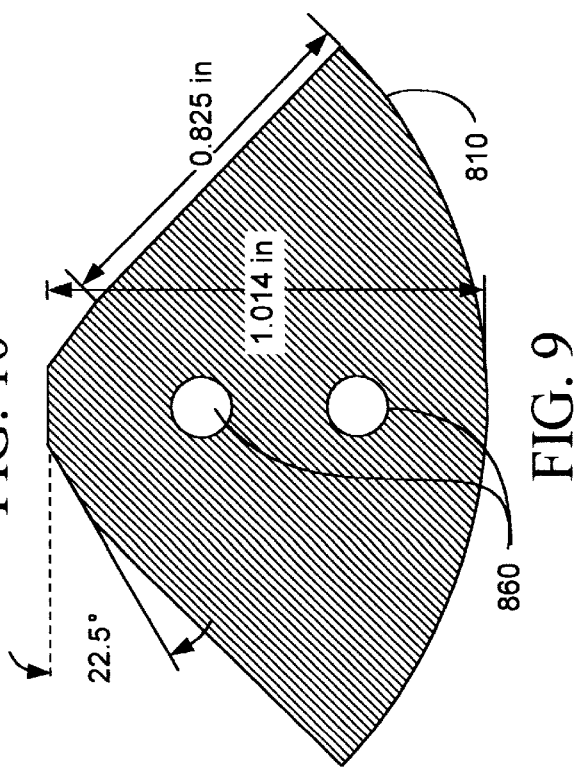
FIG. 9 illustrates a top view of one of the electrodes shown in FIG. 8.

Referring now to FIG. 9, a top view of the electrode 810 is shown. The screw holes 860 are located near the center of the electrode 810.

Figure 10:
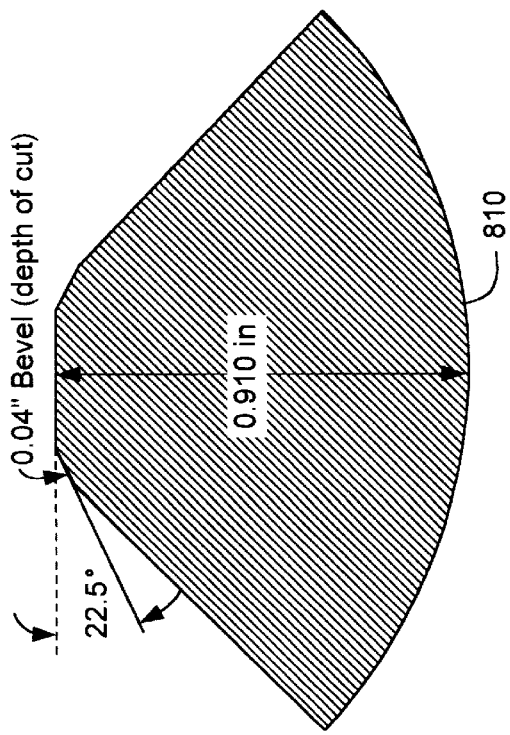
FIG. 10 illustrates a bottom view of the electrode shown in FIG. 9.

Referring now to FIG. 10, a bottom view of the electrode 810 is shown. It can be appreciated that the width of the electrode 810 at its bottom surface is less than the width at its top surface.

Figure 11:
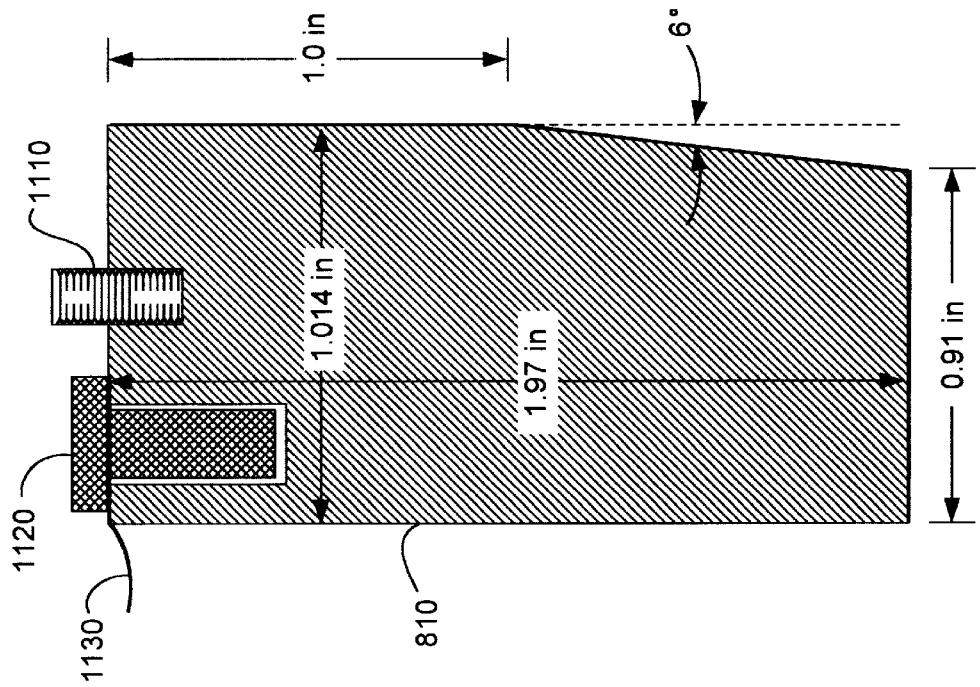
FIG. 11 illustrates a side view of the electrode shown in FIGS. 8–9.

Referring now to FIG. 11, a side view of the electrode 810 is shown. A mounting bolt 1110 is threaded into one of the holes 860. An electrical connector 1120 in located in the other of the holes 860. An electrical lead is connected to the connector 1120.

The charge on the grid elements is varied according to the desired part shape. Varying the charge on the grid elements redirects the trajectory of the droplet's fall in a controlled amount. In addition, a retarding electrostatic field can also be applied before impact to slow the droplet's fall (independent x, y, and z droplet location). Of course, an accelerating electrostatic field can be applied to speed the droplet's fall. The part itself can be charged to redirect the impact of the droplets. This may allow more precise control of droplet impact.

The electrostatic grid can take many different alternate configurations. In the case of electrodes having nonlinear and nonorthogonal electric fields, both the magnitude and direction of deflection responds nonlinearly for linear changes in the control signals. System control is considerably simplified for linear, orthogonal electric fields.

The steering of the droplet stream should be performed in a controlled atmosphere to avoid droplet reaction with air (oxide formation). Another, albeit less important, reason to use a controlled atmosphere is to avoid redirection of the droplet stream by air currents. Oxide (or other solid phase) formation at the hole can cause plugging and/or jet redirection as well as deleteriously affecting the droplet solidification.

The droplet stream cools rapidly as it travels through the controlled atmosphere. It is possible that the individual droplets achieve a semisolid state before string the piece under fabrication, which is located on an impact plate. The rate of droplet stream scanning and the frequency of repeating a droplet impact location influences the cooling rate of the droplets. The solid/liquid fraction of the droplets should be controlled to eliminate splash and flow and to obtain optimum material density and grain structure. When the solid to liquid ratio is excessively low, the droplets could splatter upon impact. On the other hand, when the solid to liquid ratio is excessively high, the droplets could scatter upon impact.

The viscosity of a given droplet need not be uniform. In more detail, the droplet can include discrete volume fractions of relatively high viscosity as well as discrete volume fractions of relatively low viscosity. Such a droplet can be characterized as a slush or mush.

Many important engineering properties of the parts fabricated in accordance with the invention are determined by the rate of metal solidification. The structural morphology of the fabricated pieces is highly dependent on the droplet pre- and post-impact heat transfer. Different cooling rates may be desired in different portions of a given part. For example, rapid cooling may be desired near wear surfaces for maximum hardness. In contrast, slower cooling may be preferred where a surface is required. Also, different cooling rates may be desired during different stages of the deposition process. For instance, nonequilibrium material compositions and amorphous metals can be deposited with very high cooling rates. Such very high rates can be achieved by jetting low thermal mass droplets into a high heat transfer environment. Significantly, cryogenic cooling of the impact plate, and therefore the piece under fabrication, will assist in the deposition of such nonequilibrium material compositions and amorphous metals.

Figure 3:
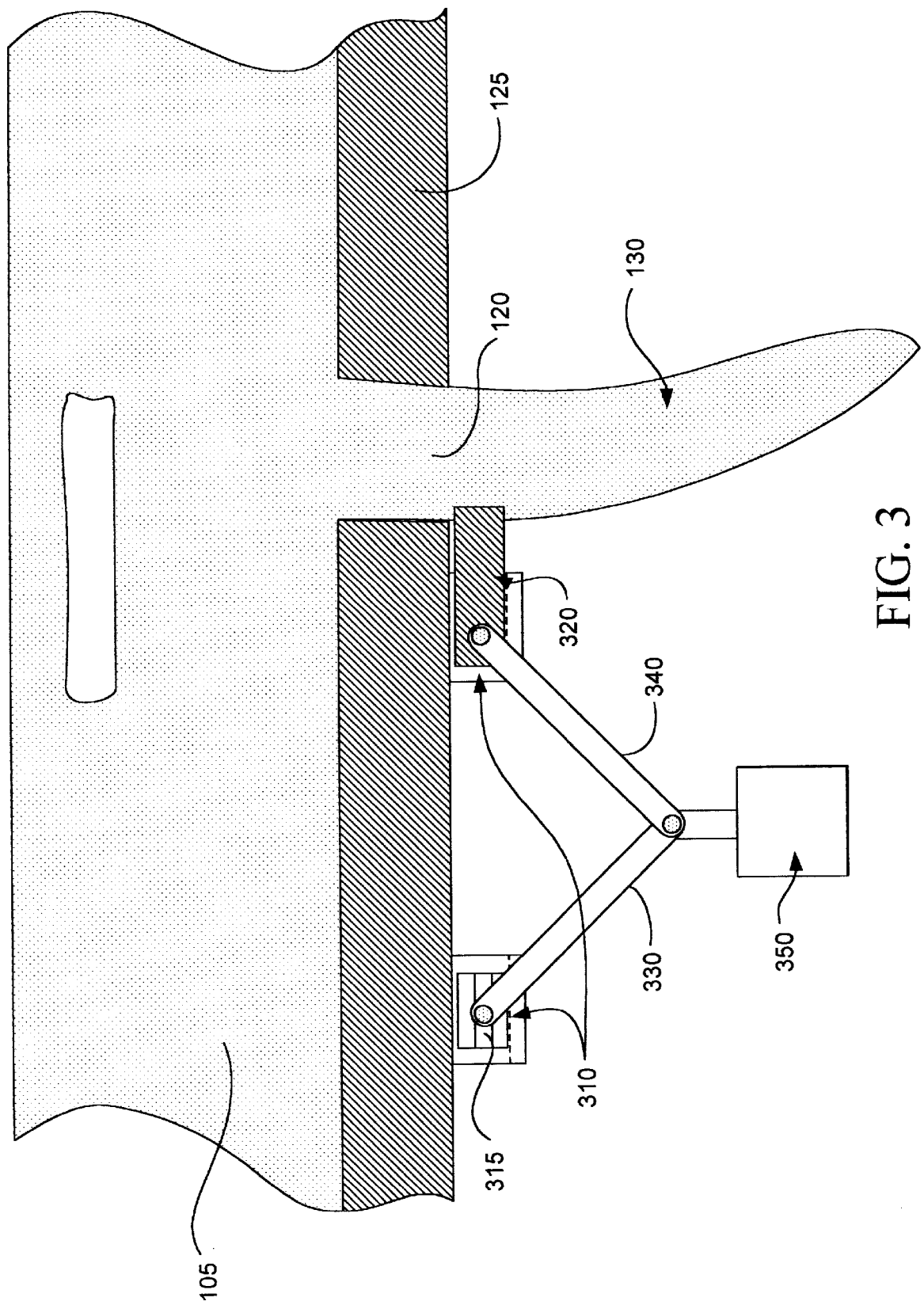
FIG. 3 illustrates a schematic elevational view of a single jet mechanical deflection apparatus, representing an embodiment of the present invention.

Referring now to FIG. 3, mechanical steering can be implemented as either an alternative to electrostatic steering or as an adjunct to electrostatic steering. In the depicted embodiment, the mechanical steering takes the form of mechanically altering the jet boundary layer by adjusting the hole constraints while still keeping the jet laminar. The apparatus for implementing the mechanical steering can be termed a mechanical redirection system or a mechanical steering assembly. In one embodiment, mechanical steering is implemented with a piezoelectrically driven deflection piece 320 located proximate the perimeter of the hole 120 and attached to the bottom of the crucible orifice plate 125. Two slide elements 310 are rigidly attached to plate 125. A member 315 is connected to the deflection piece 320 via links 330 and 340. The connection between links 330 and 340 is connected to a piezoelectric drive 350. Extension of the drive 350 drives the deflection piece 320 to impede the metal jet 130 so that the stream direction is changed in a prescribed manner. Conversely, contraction of the drive 350 retracts the piece 320. The deflection piece 320 can advantageously be fabricated from the same material as the orifice plate 125 for compatibility with the flowing molten material.

A more complete mechanical redirection system could consist of a set of three (for full 360° control) piezoelectrically driven flow shapes that are symmetrically arranged around the perimeter of the flow hole. Each of the three flow shapes would cover one third of the perimeter of the hole and would be independently positionable with regard to the axis of the hole. It can be appreciated that only one such flow shape, and its attendant drive linkage is depicted in FIG. 3.

One advantage of mechanical steering over electrostatic steering is the achievement of larger deflection angles. A second advantage is the avoidance of large steering voltages with their attendant electrical breakdown and safety limitations. A third advantage is the avoidance of stream spreading due to self repulsion of highly charged droplets.

Figure 4:
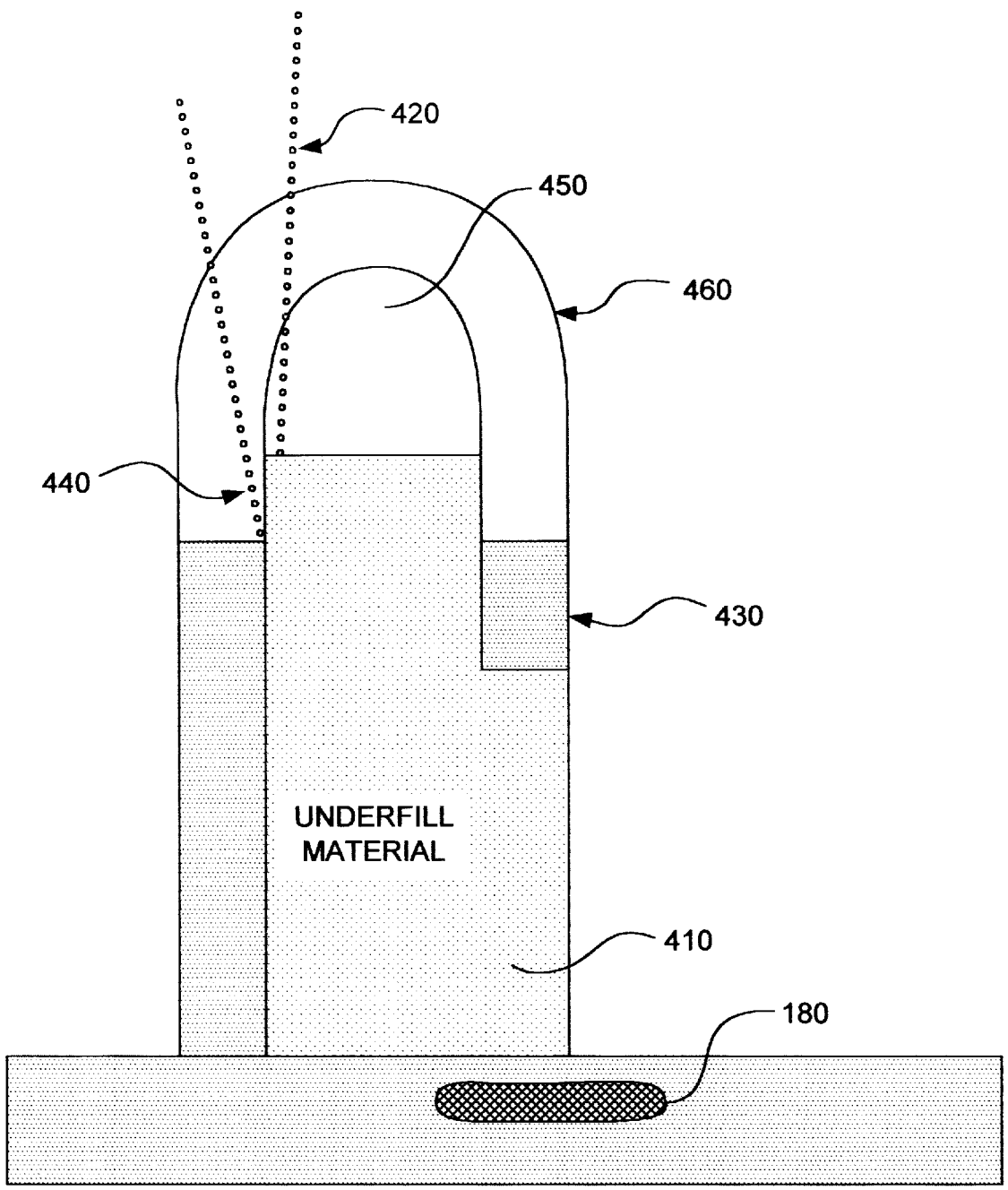
FIG. 4 illustrates a schematic elevational view of a dual jet multimaterial forming process for fabricating a solid freeform with a sharp overhang, representing an embodiment of the present invention.

Referring now to FIG. 4, it is possible to fabricate pieces that include arbitrarily sharp overhangs using multiple materials. This approach can be used as an alternate or adjunct to charging and/or tilting the impact plate. In more detail, sharp overhangs can be created by underfilling the desired overhanging shape using one, or more, lower melting point materials as an underfill material 410. The underfill material 410 is deposited with an underfill droplet stream 420. A structural material 430 is deposited with a structural droplet stream 440 adjacent the underfill material 410. A remaining support volume 450 is subsequently filled to support the subsequently deposited structural volume 460. In this way, the overhang is deposited on a support structure constructed of underfill material 410, thereby allowing the fabrication of the "looped back" shape depicted in FIG. 4.

The underfill material 410 is removed after the supported structural material is deposited by raising the piece temperature above the melting point of the underfill and allowing it to flow out. Of course, the difference in melting temperature between the underfill material 410 and the structural material 430 should be substantial so as to avoid deformation of the deposited structure during the melting and removal of the lower melting temperature material. Further, the viscosity of the lower melting point material in the liquid phase should be low.

The underfill material 410 may be deposited simultaneously with the structural material stream. Alternatively, the underfill material can be deposited by flooding a workspace in a stepwise manner after the structural material is deposited. At least two jets will be required to provide for lower melting point material underfill.

An alternative version of the multi material underfill concept would be to use a liquid underfill material with higher density than the structural material. The high heat transfer of tie semisolid structural material droplets impacting the liquid would result in a skin of structural material forming on the surface of the liquid underfill. The overhang would then be fabricated on top of the structural skin. The main advantage of the high density liquid approach (tin for example) is that as the part is fabricated, the impact platform could be lowered (in a bath of high density liquid) resulting in a continuous flat deposition surface with only minimal control required.

The materials to be deposited may include both structural as well as difficult to machine alloys such as NiAl and TiAl. Additionally, because of rapid droplet solidification, the system will allow part fabrication using novel material compositions such as nonequilibrium composition alloys and amorphous materials such as metal-glass.

The lower limit of droplet size is determined by the ability of the molten material to flow through the holes, form a jet, and subsequently a series of droplets. The lower limit of droplet size determines the minimum achievable feature size in the final part. The combination of low viscosity materials, thin orifice plates, a large pressure head, and a large electrostatic force can yield very small droplets. Small (potentially down to a few hundred nanometers) droplets, are advantageously used to form precise surfaces. Larger droplets are advantageously used to rapidly fill in larger part volumes.

The directed droplet deposition invention permits relatively rapid deposition. For example, deposition rates of approximately 0.8 $cm^3$/minute can be achieved using a single 50 micron orifice. The 50 micron orifice yields a droplet diameter of approximately 100 microns. In order to increase system throughput, several parallel jets with different droplet sizes can be used. This rapid deposition feature is scaleable by more than an order of magnitude via the use of additional orifices.

The particular manufacturing process used for implementing the invention should be inexpensive and reproducible. Conveniently, the implementation of the present invention can be carried out by using any melting and steering method. If necessary the system can be broken into two parts: droplet formation and droplet steering. Alternative droplet formation technology could then be combined with alternative droplet steering technology.

The system should be capable of continuously feeding clean raw materials into the deposition chamber. Similarly, the system should be capable of discharging completed parts without breaking the controlled atmosphere.

However, the particular manufacturing process used for implementing the invention is not essential to the present invention as long as it provides the described transformation. Normally the users of the invention will select the manufacturing process based upon energy requirements, the expected application requirements of the final product, and the demands of the overall manufacturing process.

The particular material used for the source of the melted material should be clean. Conveniently, the melted material of the present invention can be obtained from powder, or shavings, or even bulk ingots. Generally, the cleanest precursor materials can be obtained via chemical preparation. For the manufacturing operation, it is moreover an advantage to employ a material for which a reliable supply is obtainable.

However, the particular material selected for the source of the melted material is not essential to the present invention, so long as it provides the described deposition function. Normally, the users of the invention will select the best commercially available materials based upon the economics of cost and availability, the expected application requirements of the final product, and the demands of the overall manufacturing process.

While not being limited to any particular performance indicator or diagnostic identifier, preferred embodiments of the present invention can be identified one at a time by testing for the presence of high density. The test for the presence of high density can be carried out without undue experimentation by the use of a simple and conventional volume displacement experiment or a gas adsorption (e.g., BET) experiment. Among the other ways in which to seek embodiments having the attribute of high density, guidance toward the next preferred embodiment can be based on the presence of high mechanical strength.

EXAMPLES

Specific embodiments of the present invention will now be further described by the following, nonlimiting examples which will serve to illustrate in some detail various features of significance. The examples are intended merely to facilitate an understanding of ways in which the present invention may be practiced and to further enable those of skill in the art to practice the present invention. Accordingly, the examples should not be construed as limiting the scope of the present invention.

A system was developed to produce a droplet stream. Electrodes were fabricated that allow deflection of the droplet stream in two directions. A high voltage control system was implemented to amplify ±10 Volt control signals into ±10 kV electrode signals. Parts were fabricated using tin as the droplet material and two phase locked function generators as the control signal source. The droplet stream formation system was also demonstrated using higher temperature melting point metals, especially copper-bronze and aluminum

Example 1

Figure 6:
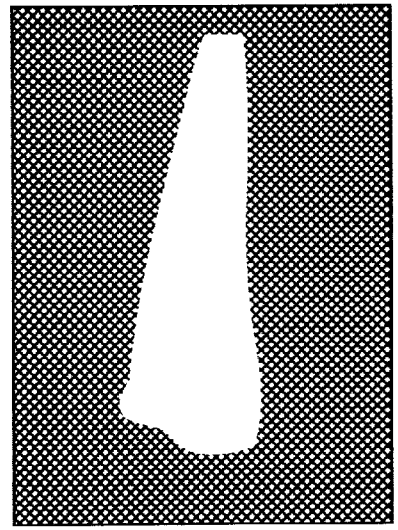
FIG. 6 illustrates an elevational view of the sample piece shown in FIG. 5.
Figure 5:
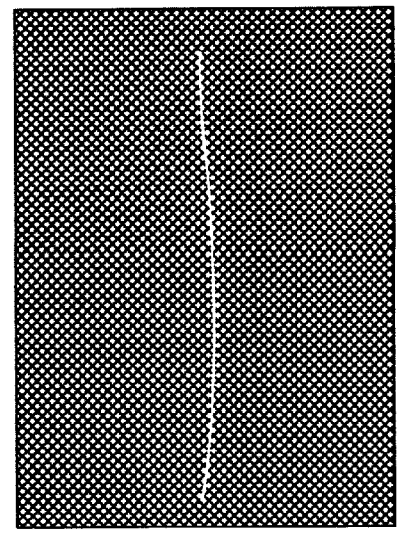
FIG. 5 illustrates a top plan view of a "two dimensional" thin walled sample piece held between two fingers, representing an embodiment of the present invention.

Thin wall (approximately 700 microns) two-dimensional structures were fabricated to demonstrate the precision of stream control. An edge view of one such thin wall two-dimensional sample is shown in FIG. 5. The sample depicted in FIG. 5 is approximately 700 microns thick. FIG. 6 shows a plan view of the same sample.

Example 2

Figure 7:
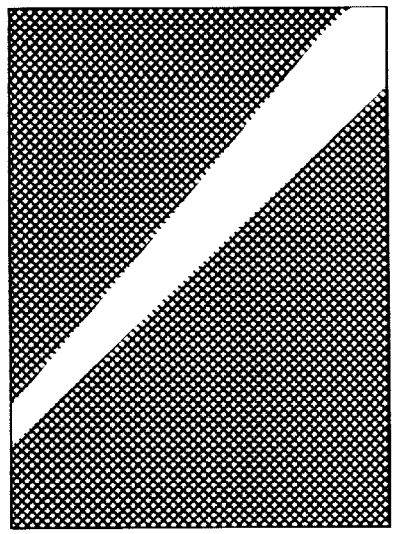
FIG. 7 illustrates an elevational view of a "three dimensional" pyramidal, hollow, thin walled sample piece, representing an embodiment of the present invention.

Three-dimensional, thin walled pyramidal structures were also fabricated. Function generators were set to produce 1 Hz triangle waves phase separated by 90° to demonstrate simultaneous control of the droplet stream in two directions. A side view of one such three-dimensional, thin walled pyramidal sample is shown in FIG. 7.

Importantly, sample pieces exhibit three distinct material zones: (1) a bottom zone where the droplets have almost completely solidified before impact resulting in a loosely connected, porous material, (2) a middle zone that is nearly 100% dense with good metallurgical properties, and (3) an upper melted zone where the droplets have not sufficiently solidified at impact. Therefore, only a narrow range of droplet pathlengths result in the correct droplet solid-to-liquid ratio to produce parts with good metallurgical properties. The solid-to-liquid ratio can be controlled by varying the relative position of the hole with respect to the impact surface. Approximately 100% dense structures can be consistently produced by controlling the solid-to-liquid ratio. The high heat content of a low ratio can provide remelting and/or reflow. An optimum droplet pathlength can be maintained as deposition proceeds by raising the crucible and associated deflector plates relative to the impact plate and/or lowering the impact plate relative to the crucible.

Practical Applications of the Invention

A practical application of the directed droplet deposition invention (that has value within the technological arts) is rapidly forming high quality net shape parts. Since its requisite components are much less massive than traditional machine tools, the $D^3$ process is particularly applicable to manufacturing replacement parts during outer space missions. Further, the present invention is particularly useful in conjunction with the fabrication of small precisely shaped parts, corrosion resistant structural parts (such as are used for the purpose of miniature medical devices), tooling for materials processing applications, or high temperature tolerant parts that are used for the purpose of motive power plants, such as thrusters, or the like. There are virtually innumerable uses for the present invention, all of which need not be detailed here.

Advantages of the Invention

Directed droplet deposition ($D^3$), representing an embodiment of the invention can be cost effective and advantageous for at least the following reasons. First of all, $D^3$ directly produces net shape final parts that are fully dense and fine grained (resulting in superior mechanical properties) directly from electronic representations without the need for any intermediate processing steps, molds, or hard tooling. Forming the parts directly from a liquid -obviates the need for any precision feedstock (e.g., powder). The range of alloys formed is only limited by compatibility with the orifice. Notably, refractory and hard to machine alloys can be deposited. Secondly, the electrostatically directed droplet stream can be used to form complex, fine featured three dimensional (3D) parts. The part metallurgy is spatially tailorable. It is possible to have several simultaneous jets each with its own alloy. The path length, spray repetition and orifice size are each individually adjustable. These factors control the droplet cooling rate which in turn controls the part density and grain structure. There is virtually no waste stream.

Finally, the invention permits the deployment of a free surface phase change front. This front can produce strain free parts.

All the disclosed embodiments of the invention described herein can be realized and practiced without undue experimentation. Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the directed droplet deposition system described herein is a physically separate module, it will be manifest that the directed droplet system may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It is intended that the appended claims cover all such additions, modifications and rearrangements. Expedient embodiments of the present invention are differentiated by the appended subclaims.

REFERENCES

1. Marks Mechanical Engineering Handbook, 10th ed., McGraw Hill, (Eugene A Avallone et al. eds., 1996).

2. "Charge Synchronization for a Piezoelectric Droplet Generator," Q. D. Qarnica et al., Rev. Sci. Instrum., 64 (8) August 1993, pages 2234–2339.

3. The Electrical Engineering Handbook, CRC Press, (Richard C. Dorf et al. eds., 1993).

What is claimed is:

1. An apparatus, comprising:
    a melting vessel defining a first hole for producing a first jet of material;
    a first jet destabilizer connected to said melting vessel, said first jet destabilizer adapted to break said first jet into a first stream of droplets;
    a first charging structure connected to said melting vessel, said first charging structure adapted to induce an electrical charge in a tip of said first jet of material, said charge being retained upon each drop in said first stream of droplets and forcing separation of each drop in said stream of droplets;
    a first set of electrodes connected to said first charging structure, said first set of electrodes adapted to deflect said first stream of droplets electrostatically; and
    a second set of electrodes connected to said first set of electrodes, said second set of electrodes adapted to deflect said first stream of droplets electrostatically in a second direction, said first set of electrodes and said second set of electrodes giving both x and y directional control to each droplet in said first stream of droplets, wherein said first set of electrodes and said second set of electrodes are driven by a set of drive electronics; and
    wherein said first jet destabilizer and said first charging structure cooperate to i) locate a first break-up point where said first stream of droplets is formed from said first jet of material and ii) determine a first charge to mass ratio that is substantially equal for each drop in said first stream of droplets.

2. The apparatus of claim 1, wherein said melting vessel includes a second hole for producing a second jet of material, and, further comprising a second jet destabilizer connected to said melting vessel; and a second charging structure connected to said melting vessel,
    wherein said second jet destabilizer and said second charging structure cooperate to i) locate a second break-up point where said second stream of droplets is formed from said second jet of material and i) determine a second charge to mass ratio that is substantially equal for each drop in said second stream of droplets.

3. The apparatus of claim 1, further comprising a tilting impact plate connected to said melting vessel.

4. The apparatus of claim 1, further comprising a cooled impact plate connected to said melting vessel.

5. The apparatus of claim 1, further comprising a mechanical redirection system connected to said melting vessel, said mechanical redirection system i) being adjacent to said first hole and ii) deflecting said first jet of material mechanically.

6. An apparatus, comprising:
    a melting vessel defining a first hole for producing a first jet of material;
    a first jet destabilizer connected to said melting vessel, said first jet destabilizer adapted to break said first jet into a first stream of droplets;
    a first charging structure connected to said melting vessel, said first charging structure adapted to induce an electrical charge in a tip of said first jet of material, said charge being retained upon each drop in said first stream of droplets and forcing separation of each drop in said stream of droplets; and
    a mechanical redirection system connected to said melting vessel and located proximate said first hole, said mechanical redirection system adapted to deflect said first jet of material by mechanically altering a jet boundary layer by adjusting constraints of said first hole while still keeping said first jet of material laminar,
    wherein said first jet destabilizer and said first charging structure cooperate to i) locate a first break-up point where said first stream of droplets is formed from said first jet of material and ii) determine a first charge to mass ratio that is substantially equal for each drop in said first stream of droplets.

7. The apparatus of claim 6, further comprising:
    a set of electrodes connected to said first charging structure, said set of electrodes deflecting said first stream of droplets.

8. The apparatus of claim 6, wherein said melting vessel includes a second hole for producing a second jet of material, and, further comprising a second jet destabilizer connected to said melting vessel; and a second charging structure connected to said melting vessel,
    wherein said second jet destabilizer and said second charging structure cooperate to i) locate a second break-up point where said second stream of droplets is formed from said second jet of material and ii) determine a second charge to mass ratio that is substantially equal for each drop in said second stream of droplets.

9. The apparatus of claim 6, further comprising a tilting impact plate connected to said crucible.

10. The apparatus of claim 6, further comprising a cooled impact plate connected to said crucible.

11. The apparatus of claim 6, wherein said mechanical redirection system includes a plurality of piezoelectrically driven flow shapes that are symmetrically arranged around a perimeter of said first hole.

12. An apparatus, comprising:
    a melting vessel defining a first hole;
    a jet destabilizer connected to said melting vessel;
    a charging structure connected to said melting vessel; and
    a mechanical redirection system connected to said melting vessel and located proximate said first hole to mechanically alter a jet boundary layer by adjusting constraints of said first hole while still keeping a first jet of material laminar.

13. An apparatus, comprising:
    a melting vessel defining a hole;
    a jet destabilizer connected to said melting vessel;
    a charging structure connected to said melting vessel; and
    a first set of electrodes and a second set of electrodes connected to said charging structure, said first set of electrodes and said second set of electrodes giving both x and y directional control to each droplet in a stream of droplets.

* * * * *